US009213296B2

(12) United States Patent
Yoo

(10) Patent No.: US 9,213,296 B2
(45) Date of Patent: Dec. 15, 2015

(54) IMAGE FORMING APPARATUS

(75) Inventor: Man Woo Yoo, Suwon-si (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 202 days.

(21) Appl. No.: 13/282,816

(22) Filed: Oct. 27, 2011

(65) Prior Publication Data

US 2012/0104866 A1 May 3, 2012

(30) Foreign Application Priority Data

Nov. 2, 2010 (KR) ........................ 10-2010-0108236

(51) Int. Cl.
*H02J 4/00* (2006.01)
*G03G 15/00* (2006.01)

(52) U.S. Cl.
CPC ............ *G03G 15/80* (2013.01); *G03G 15/5004* (2013.01); *Y10T 307/729* (2015.04)

(58) Field of Classification Search
CPC .......................................................... H02J 4/00
USPC ......................................... 307/86; 399/88, 90
See application file for complete search history.

(56) References Cited

U.S. PATENT DOCUMENTS 4,528,459 A * 7/1985 Wiegel ............................ 307/66
5,710,959 A * 1/1998 Hirooka et al. ................. 399/88
7,460,808 B2 * 12/2008 Okada ............................. 399/88
8,232,680 B2 * 7/2012 DiMarco et al. ................ 307/85
8,253,277 B2 * 8/2012 Lin et al. ......................... 307/86
8,385,766 B2 * 2/2013 Inukai ............................. 399/88
8,531,055 B2 * 9/2013 Adest et al. ..................... 307/43
2006/0125904 A1 * 6/2006 Shokai .......................... 347/108
2006/0159482 A1 7/2006 Okada
2006/0177236 A1 * 8/2006 Kowari et al. ................... 399/88
2012/0002995 A1 * 1/2012 Choi et al. ...................... 399/88

FOREIGN PATENT DOCUMENTS

JP 2000-326589 11/2000

OTHER PUBLICATIONS

Chinese Office Action dated Mar. 30, 2015 in corresponding Chinese Patent Application No. 201110340944.X.

* cited by examiner

*Primary Examiner* — Rexford Barnie
*Assistant Examiner* — Daniel Kessie
(74) *Attorney, Agent, or Firm* — Staas & Halsey LLP

(57) ABSTRACT

An image forming apparatus to safely supply or interrupt power according to opening or closing of a cover includes a power source unit to output low power and high power, an interlock switch unit to be turned on or off according to opening or closing of a cover, and an engine power circuit unit. The engine power circuit unit includes cover opening/closing sensing switches connected to the interlock switch unit to be turned on or off according to whether the interlock switch unit is on or off, and power supply switches connected to the power source unit to apply or interrupt the power from the power source unit according to a determination of whether the cover opening/closing sensing switches are on or off.

20 Claims, 8 Drawing Sheets

| REFERENCE NUMERAL | LABEL |
|---|---|
| 44 | FRONT COVER SWITCH |
| 48 | REAR COVER SWITCH |
| 74 | COVER OPENING/CLOSING SENSING SWITCH |
| 78 | COVER OPENING/CLOSING SENSING SWITCH |
| 84 | POWER SUPPLY SWITCH |
| 88 | POWER SUPPLY SWITCH |

| REFERENCE NUMERAL | LABEL |
|---|---|
| 44 | FRONT COVER SWITCH |
| 48 | REAR COVER SWITCH |
| 74 | COVER OPENING/CLOSING SENSING SWITCH |
| 78 | COVER OPENING/CLOSING SENSING SWITCH |
| 84 | POWER SUPPLY SWITCH |
| 88 | POWER SUPPLY SWITCH |

| REFERENCE NUMERAL | LABEL |
|---|---|
| 44 | FRONT COVER SWITCH |
| 48 | REAR COVER SWITCH |
| 74 | COVER OPENING/CLOSING SENSING SWITCH |
| 78 | COVER OPENING/CLOSING SENSING SWITCH |
| 84 | POWER SUPPLY SWITCH |
| 88 | POWER SUPPLY SWITCH |
| 91 | FIRST POWER SWITCH UNIT |
| 94 | SECOND POWER SWITCH UNIT |

| REFERENCE NUMERAL | LABEL |
|---|---|
| 44 | FRONT COVER SWITCH |
| 48 | REAR COVER SWITCH |
| 74 | COVER OPENING/CLOSING SENSING SWITCH |
| 78 | COVER OPENING/CLOSING SENSING SWITCH |
| 84 | POWER SUPPLY SWITCH |
| 88 | POWER SUPPLY SWITCH |

| REFERENCE NUMERAL | LABEL |
|---|---|
| 44 | FRONT COVER SWITCH |
| 48 | REAR COVER SWITCH |
| 74 | COVER OPENING/CLOSING SENSING SWITCH |
| 78 | COVER OPENING/CLOSING SENSING SWITCH |
| 84 | POWER SUPPLY SWITCH |
| 88 | POWER SUPPLY SWITCH |
| 91 | FIRST POWER SWITCH UNIT |
| 94 | SECOND POWER SWITCH UNIT |

| REFERENCE NUMERAL | LABEL |
|---|---|
| 10 | FRONT COVER |
| 20 | REAR COVER |
| 44 | FRONT COVER SWITCH |
| 48 | REAR COVER SWITCH |

| REFERENCE NUMERAL | LABEL |
|---|---|
| 10 | FRONT COVER |
| 20 | REAR COVER |
| 44 | FRONT COVER SWITCH |
| 48 | REAR COVER SWITCH |

IMAGE FORMING APPARATUS

CROSS-REFERENCE TO RELATED APPLICATIONS

This application claims the benefit of priority under 35 U.S.C. §119 from Korean Patent Application No. 10-2010-0108236, filed on Nov. 2, 2010 in the Korean Intellectual Property Office, the disclosure of which is incorporated herein by reference in its entirety.

BACKGROUND OF THE INVENTION

1. Field of the Invention

Embodiments of the present general inventive concept relate to an image forming apparatus to control a power supply by sensing opening or closing of a cover.

2. Description of the Related Art

An electro-photographic image forming apparatus is designed to form an image on paper by forming an electrostatic latent image on a photoconductor using a laser beam and attaching a toner to the formed electrostatic latent image. To attach the toner to the photoconductor, it may be necessary to positively charge the photoconductor. To this end, a high voltage in hundreds of volts is typically applied to the photoconductor.

International standards, such as Underwriters Laboratories (UL), stipulate that current leakage from high-voltage devices to a human coming into contact therewith must be less than 2 mA. This is recommended for user safety when a user who has a body resistance of about 2 KΩ is exposed to a high voltage, and is equally applied to an image forming apparatus, such as a laser printer. To this end, an electro-photographic image forming apparatus, such as a laser printer, includes a mechanical switch (or an interlock switch) to interrupt power when a developing unit containing toner and a photoconductor is separated from a main body, or when a cover is opened to remove a paper jam.

SUMMARY OF THE INVENTION

The present general inventive concept provides an image forming apparatus to safely supply or interrupt power according to opening or closing of a cover.

Additional aspects and advantages of the present general inventive concept will be set forth in part in the description which follows and, in part, will be obvious from the description, or may be learned by practice of the general inventive concept.

Additional aspects and advantages of the present general inventive concept will be set forth in part in the description which follows and, in part, will be obvious from the description, or may be learned by practice of the general inventive concept The foregoing and/or other aspects and utilities of the present general inventive concept may be achieved by providing an image forming apparatus to apply or interrupt operating power according to opening or closing of covers, the image forming apparatus including a power source unit including a first power source to output a low power and a second power source to output a high power, an interlock switch unit connected to the first power source to be turned on or off according to opening or closing of the covers, and an engine power circuit unit including a plurality of cover opening/closing sensing switches connected to the interlock switch unit while being connected to each other in series to be turned on or off according to a determination of whether the interlock switch unit is on or off, and a plurality of power supply switches connected to the second power source and the cover opening/closing sensing switches to apply or interrupt the high power output from the second power source to an engine according to a determination of whether the cover opening/closing sensing switches are on or off.

The power supply switches may be turned on if all of the plurality of cover opening/closing sensing switches connected in series is turned on.

The power supply switches may be turned off if at least one of the plurality of cover opening/closing sensing switches connected in series is turned off.

The plurality of power supply switches may be connected to each other in series, and the high power is not applied to the engine if at least one of the plurality of power supply switches is turned off.

Any one of the plurality of power supply switches may be connected to the second power source to receive the high power.

If one of the power supply switches connected to the second power source to receive the high power is turned on, the high power may be transmitted to another power supply switch.

Resistors for high voltage distribution may be provided between the cover opening/closing sensing switches and the power supply switches, and if the cover opening/closing sensing switches are turned on, a voltage of the second power source may be distributed to the resistors and the power supply switches may be turned on according to the distributed voltage.

The interlock switch unit may include the same number of interlock switches as the number of the covers, and the interlock switches may be connected to each other in series.

The image forming apparatus may further include a control unit to control driving of the engine according to the supply or interruption of the low power.

The foregoing and/or other aspects and utilities of the present general inventive concept may also be achieved by providing an image forming apparatus to apply or interrupt operating power according to opening or closing of a cover, the image forming apparatus including a power source unit including a first power source to output a low power and a second power source to output a high power, an interlock switch unit connected to the first power source to be turned on or off according to opening or closing of the cover, and an engine power circuit unit including a plurality of power supply switches connected to the second power source to apply or interrupt the high power to an engine and a plurality of cover opening/closing sensing switches connected to the interlock switch unit to be turned on or off according to a determination of whether the interlock switch unit is on or off, the plurality of cover opening/closing sensing switches corresponding to the plurality of power supply switches respectively.

Any one of the plurality of power supply switches may be connected to the second power source to receive the high power.

If one of the power supply switches connected to the second power source to receive the high power is turned on, the high power may be transmitted to another power supply switch.

Resistors for high voltage distribution may be provided between the cover opening/closing sensing switches and the power supply switches, and if the cover opening/closing sensing switches are turned on, a voltage of the second power source may be distributed to the resistors and the power supply switches may be turned on according to the distributed voltage.

The image forming apparatus may further include a control unit to control driving of the engine according to the supply or interruption of the low power.

The foregoing and/or other aspects and utilities of the present general inventive concept may also be achieved by providing an image forming apparatus to apply or interrupt operating power according to opening or closing of covers, the image forming apparatus including a power source unit including a first power source to output a low power and a second power source to output a high power, an interlock switch unit connected to the first power source to generate a signal to indicate opening or closing of the covers, a control unit to generate a control signal according to the signal of the interlock switch unit; and a unit to transmit the high power to an engine according to the signal of the interlock switch unit, wherein the lower power may be selectively supplied to the engine according to the signal of the interlock switch unit and the control single of the control unit.

The image forming apparatus may further include a switch disposed between the control unit and the engine to supply the low power to the engine according to the signal of the interlock switch unit and the control signal of the control unit.

The switch may be an AND gate circuit having two inputs of the signal of the interlock switch unit and the control signal of the control unit and an output of the supplied low power to the engine.

The unit may include a first switch to transmit the lower power to an engine according to the signal of the interlock switch unit and the control signal of the control unit, and a second switch to transmit the high power to the engine according to the signal of the interlock switch unit.

The unit may include one or more AND gate circuit.

The foregoing and/or other aspects and utilities of the present general inventive concept may also be achieved by providing. A method of an image forming apparatus having one or more covers, the method including outputting a lower power from a first power source and a high power from a second power source, generating a signal according to at least one opening or closing status of the covers using an interlock switch unit, generating a control signal according to the signal of the interlock switch unit, and transmitting the high power to an engine according to the signal of the interlock switch unit, wherein the lower power may be selectively supplied to the engine according to the signal of the interlock switch unit and the control single of the control unit.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which.

DETAILED DESCRIPTION OF THE PREFERRED EMBODIMENTS

Figure 1:
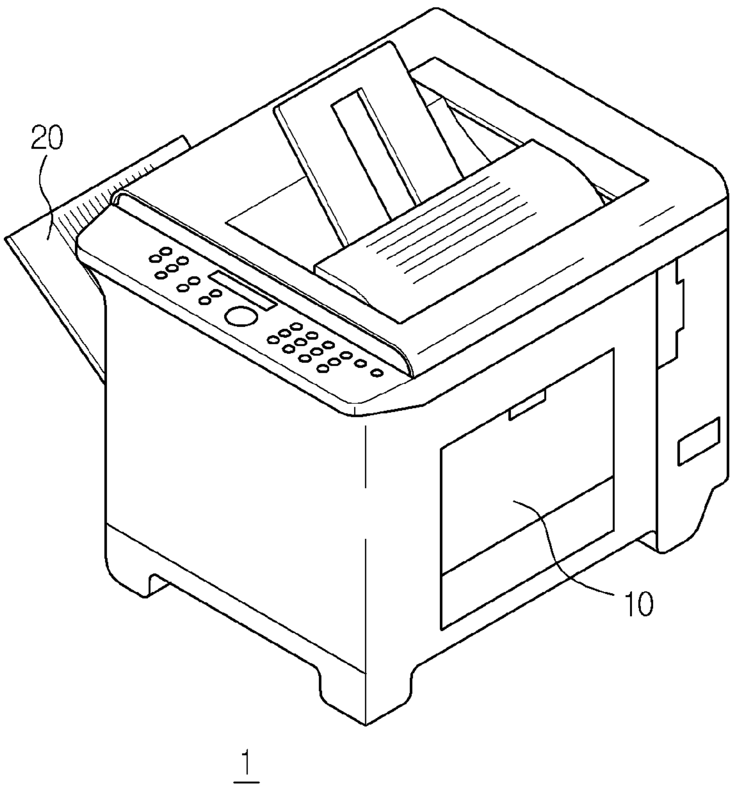
FIG. 1 is a perspective view illustrating an outer appearance of an image forming apparatus according to an embodiment of the present general inventive concept.

Reference will now be made in detail to the embodiments of the present general inventive concept, examples of which are illustrated in the accompanying drawings, wherein like reference numerals refer to the like elements throughout. The embodiments are described below in order to explain the present general inventive concept while referring to the figures.

FIG. 1 is a perspective view illustrating an image forming apparatus 1 according to an embodiment of the present general inventive concept.

The image forming apparatus 1 may include a front cover 10 to open or close a front surface of a main body, and a rear cover 20 to open or close a rear surface of the main body. The front cover 10 and the rear cover 20 are opened when the image forming apparatus 1 needs to be cleaned, or to replenish toner. The covers 10 and 20 of the image forming apparatus 1 according to the embodiment may be provided to open or close lateral surfaces of the main body rather than the front and rear surfaces and the number of the covers is not limited.

Figure 2:
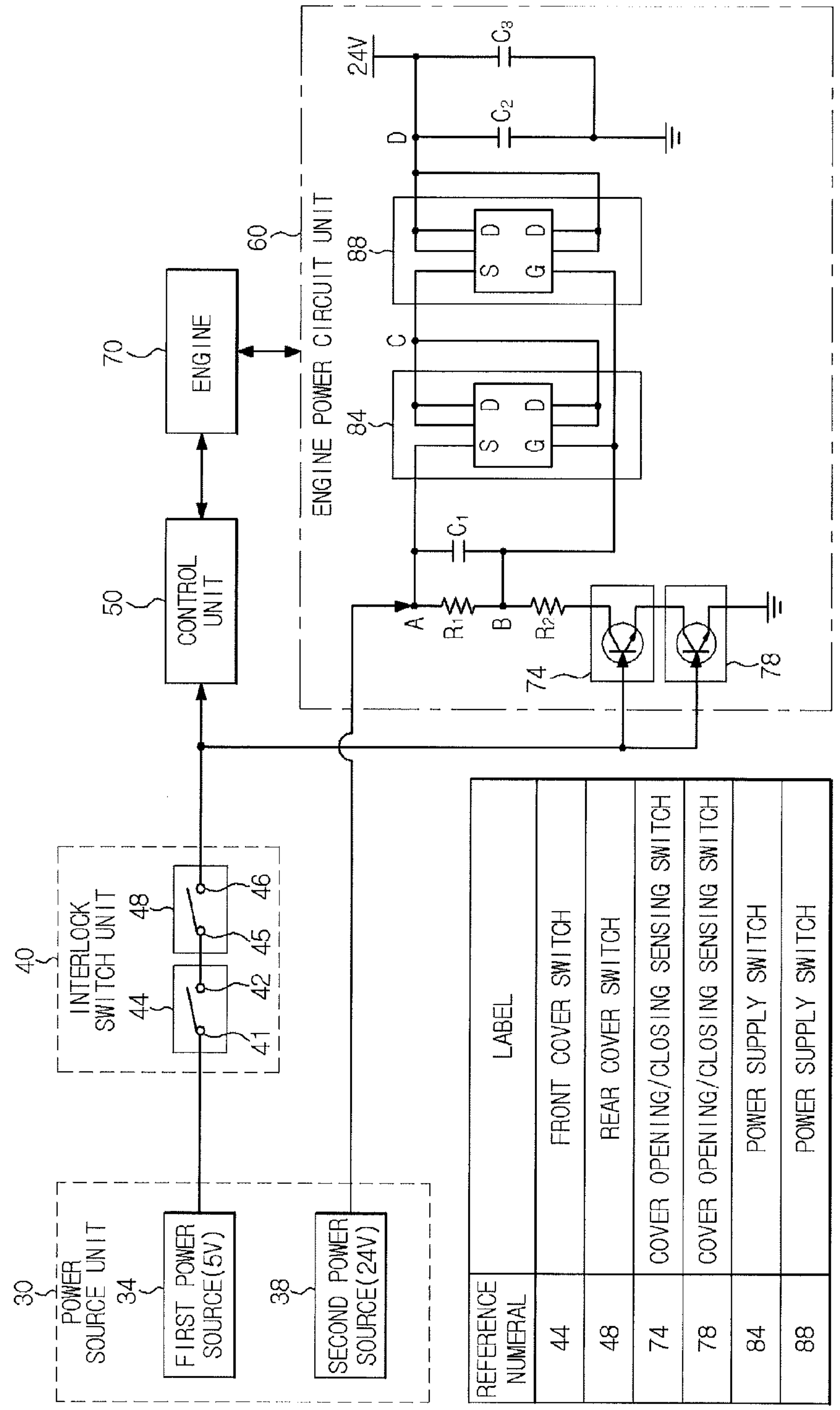
FIG. 2 is a block diagram illustrating a circuit configuration of an image forming apparatus according to an embodiment of the present general inventive concept.

FIG. 2 is a block diagram illustrating a circuit configuration of the image forming apparatus according to an embodiment of the present general inventive concept.

The image forming apparatus 1 may include a power source unit 30, an interlock switch unit 40, a control unit 50, and an engine power circuit unit 60.

The power source unit 30 may include a first power source 34 to output low power so as to transmit opening/closing signals of the covers 10 and 20 to the control unit 50 and the engine power circuit unit 60, and a second power source 38 to output high power to an engine of the image forming apparatus 1. The first power source 34 supplies a first power required to transmit opening/closing signals of the covers 10 and 20 to the control unit 50 and the engine power circuit unit 60 and thus, needs to provide a voltage (for example, 5V) of a predetermined reference or less. The second power source 38 supplies a second power to be transmitted to the engine power circuit unit 60 to operate the image forming apparatus 1 and thus, needs to provide a higher voltage (for example, 24V), as the first power, than the first power of the first power source 34. The first power source 34 is connected to the interlock switch unit 40, and the second power source 38 is connected to the engine power circuit unit 60.

The interlock switch unit 40 may include interlock switches 44 and 48 to correspond to the covers 10 and 20. The number of the interlock switches 44 and 48 may be equal to the number of the covers 10 and 20 of the image forming apparatus 1. In the present embodiment, the image forming apparatus 1 includes the front cover 10 and the rear cover 20, and therefore, two interlock switches 44 and 48, which are equal in number to the covers 10 and 20, will be described hereinafter by way of example.

The interlock switch unit 40 may include a front cover switch 44 and a rear cover switch 48.

The front cover switch 44 is turned on or off according to opening or closing of the front cover 10 of the image forming apparatus 1. The rear cover switch 48 is turned on or off according to opening or closing of the rear cover 20 of the image forming apparatus 1. The front cover switch 44 may include a first pole 41 and a first connector 42. The front cover switch 44 releases connection between the first pole 41 and the first connector 42 if the front cover 10 is opened, and connects the first pole 41 and the first connector 42 to each other if the front cover 10 is closed. The rear cover switch 48 may include a second pole 45 and a second connector 46. The rear cover switch 48 releases connection between the second pole 45 and the second connector 46 if the rear cover 20 is opened, and connects the second pole 45 and the second connector 46 to each other if the rear cover 20 is closed. The front cover switch 44 and the rear cover switch 48 are connected to each other in series.

The interlock switch unit 40 is connected to the first power source 34. The power generated from the first power source 34 is applied to the control unit 50 and the engine power circuit unit 60 or is interrupted, according to opening or closing of the front cover switch 44 and the rear cover switch 48 provided in the interlock switch unit 40. If either the front cover switch 44 or the rear cover switch 48 is in a released state, the power generated from the first power source 34 is not applied to the control unit 50 and the engine power circuit unit 60. The power generated from the first power source 34 is applied to the control unit 50 and the engine power circuit unit 60 only when both the front cover switch 44 and the rear cover switch 48 are in a connected state. A signal, applied to the control unit 50 and the engine power circuit unit 60 when the power from the first power source 34 is applied to the control unit 50 and the engine power circuit unit 60 by way of the interlock switch unit 40 will be referred to as a high-level signal, and a signal, applied to the control unit 50 and the engine power circuit unit 60 when the power from the first power source 34 is interrupted by the interlock switch unit 40 and is no longer applied to the control unit 50 and the engine power circuit unit 60, will be referred to as a low-level signal. The lower-level signal may be a 0 Voltage, a ground voltage, or a potential lower than the high-level signal.

The interlock switch unit 40 may be a mechanical switch not to be influenced by electrical malfunction of the image forming apparatus 1. The mechanical switch is mechanically operated according to opening or closing of the covers 10 and 20.

The control unit 50 controls the engine provided in the image forming apparatus 1. The engine receives power from the engine power circuit unit 60 and is driven under control of the control unit 50. If the high-level signal is applied from the interlock switch unit 40 to the control unit 50, the control unit 50 determines that the covers 10 and 20 of the image forming apparatus 1 are in a closed state, and then, drives the engine to operate the image forming apparatus 1. If the low-level signal is applied from the interlock switch unit 40 to the control unit 50, the control unit 50 determines that the covers 10 and 20 of the image forming apparatus 1 are in an open state and thus, does not drive the engine. The control unit 50, as described above, drives the engine according to opening or closing of the covers 10 and 20 using a program stored therein.

The engine power circuit unit 60 may include a sensing switch unit having a plurality of cover opening/closing sensing switches 74 and 78 to receive a signal depending on opening or closing of the covers 10 and 20, and a power supply unit 80 having a plurality of power supply switches 84 and 88 to receive power from the second power source 38.

The plurality of cover opening/closing sensing switches 74 and 78, which receives a signal depending on opening or closing of the covers 10 and 20, may be transistors. Such a transistor is turned on if a high-level signal is applied to a base thereof, and is turned off if a low-level signal is applied to the base. More particularly, at least two cover opening/closing sensing switches 74 and 78 may be provided to receive a signal depending on opening or closing of the covers 10 and 20 from the first power source 34. The cover opening/closing sensing switches 74 and 78, which receive a signal depending on opening or closing of the covers 10 and 20 from the first power source 34, are connected to each other in series. The plurality of cover opening/closing sensing switches 74 and 78 are provided to allow at least one of the plurality of cover opening/closing sensing switches 74 and 78 to remain an off state even if others of the plurality of cover opening/closing sensing switches 74 and 78 fail and continuously remain in an on state, preventing malfunction of the engine power circuit unit 60. Meanwhile, since the plurality of cover opening/closing sensing switches 74 and 78 is controlled according to a signal transmitted from a power source supplying power of a predetermined reference voltage or less, i.e., a signal depending on opening or closing of the covers 10 and 20 from the first power source 34, small-capacity transistors may be used.

The plurality of power supply switches 84 and 88, which receive power from the second power source 38, may include a plurality of power Metal Oxide Semiconductor Field Effect Transistors (MOSFET). Such a power MOSFET, designed for power supply, is turned on if a potential difference between a source S and a gate G thereof has a predetermined value or higher. The power supply switches 84 and 88, which receive the power from the second power source 38, are connected to each other in series. Thus, even if one of the plurality of switches 84 and 88 fails and remains in a continual on state, others of the plurality of switches 84 and 88 may remain in off state, thereby preventing malfunction of the engine power circuit unit 60.

Hereinafter, a circuit operation of the image forming apparatus 1 will be described with reference to FIG. 2.

If the front cover 10 and the rear cover 20 of the image forming apparatus 1 are closed, the front cover switch 44 and the rear cover switch 48 are turned on. If the front cover switch 44 and the rear cover switch 48 are turned on, the voltage (i.e., the high-level signal) of the first power source 34 is applied to the control unit 50 and the engine power circuit unit 60.

If the voltage of the first power source 34 is applied to the control unit 50, the control unit 50 may drive the engine using a program and may indicate the closed state of the covers 10 and 20 via a display unit (not illustrated).

The engine power circuit unit 60 is configured such that the voltage of the first power source 34 is applied to the plurality of transistors 74 and 78 if the front cover switch 44 and the rear cover switch 48 are in an on state. As described above, the plurality of transistors 74 and 78, to which the voltage of the first power source 34 is applied, is provided, and the number of the transistors 74 and 78 is not limited.

If the voltage (i.e., the high-level signal) of the first power source 34 is input to the plurality of transistors 74 and 78 of the engine power circuit unit 60, the plurality of transistors 74 and 78 is turned on. If the plurality of transistors 74 and 78 is turned on, the voltage applied from the second power source 38 to a point "A" is distributed to a point "B" via voltage distribution resistors R1 and R2. Thus, a potential difference between the point "A" and the point "B" causes an equal potential difference between a source S and a gate G of the first power MOSFET 84. The first power MOSFET is turned on if a predetermined potential difference occurs between the source S and the gate G. If the first power MOSFET 84 is turned on, the voltage of the second power source 38 is applied to a drain D. Since the drain D of the first power MOSFET 84 is connected to a source S of the second power MOSFET 88, the voltage of the second power source 38 is applied to the source S of the second power MOSFET 88. In this way, the same potential difference as between the point "A" and the point "B" occurs between the source S and a gate G of the second power MOSFET 88, and the voltage of the second power source 38 is applied to a drain D of the second power MOSFET 88, i.e. to a point "D" via the same operation as in the above described first power MOSFET 84. In summary, the voltage of the second power source 38 is applied to the point "D" via switching of the first power MOSFET 84 and the second power MOSFET 88, and the voltage applied to the point "D" is used to drive the engine.

If at least one of the front cover 10 and the rear cover 20 of the image forming apparatus 1 is open, at least one of the front cover switch 44 and the rear cover switch 48 is turned off. If at least one of the front cover switch 44 and the rear cover switch 48 is turned off, the voltage (i.e., the high-level signal) of the first power source 34 is not applied to the control unit 50 and the engine power circuit unit 60. That is, instead of the high-level signal (for example, a signal corresponding to a voltage of 5V), the low-level signal, is applied to the control unit 50 and the engine power circuit unit 60.

If the low-level signal is applied to the control unit 50, the control unit 50 may prevent driving of the engine based on software, and may indicate the open state of the covers 10 and 20 via the display unit (not shown).

The engine power circuit unit 60 is configured such that the low-level signal is applied to the plurality of transistors 74 and 78 if at least one of the front cover switch 44 and the rear cover switch 48 is turned off. As described above, the plurality of transistors 74 and 78 is provided to receive the high-level signal when the voltage of the first power source 34 is applied, or the low-level signal when the voltage of the first power source 34 is interrupted, and the number of the transistors 74 and 78 is not limited.

If a signal generated when the voltage of the first power source 34 is not applied to the plurality of transistors 74 and 78 of the engine power circuit unit 60, i.e. the low-level signal (for example, a signal corresponding to zero volts) is input to the plurality of transistors 74 and 78, the plurality of transistors 74 and 78 is turned off. If the plurality of transistors 74 and 78 is turned off, the voltage of the second power source 38 is not applied to the voltage distribution resistors R1 and R2 and therefore, the same voltage is applied from the second power source 38 to the point "A" and the point "B". If the point "A" and the point "B" have the same voltage, the source S and the gate G of the first power MOSFET 84 have the same voltage. The first power MOSFET is turned off if a predetermined potential difference does not occur between the source S and the gate G. Thus, the first power MOSFET 84 is turned off because the source S and the gate G have the same voltage, and the voltage of the second power source 38 is not applied to the source S of the second power MOSFET 88. Consequently, if at least one of the front cover 10 and the rear cover 20 of the image forming apparatus 1 is open, it may be possible to interrupt the supply of current from the engine power circuit unit 60 to the engine based on hardware.

In the meantime, reference characters "C1," "C2" and "C3" represent capacitors installed for noise removal and surge protection, and the engine is a device using voltage to drive the image forming apparatus 1 (for example, a motor or a high-voltage generator).

Figure 3:
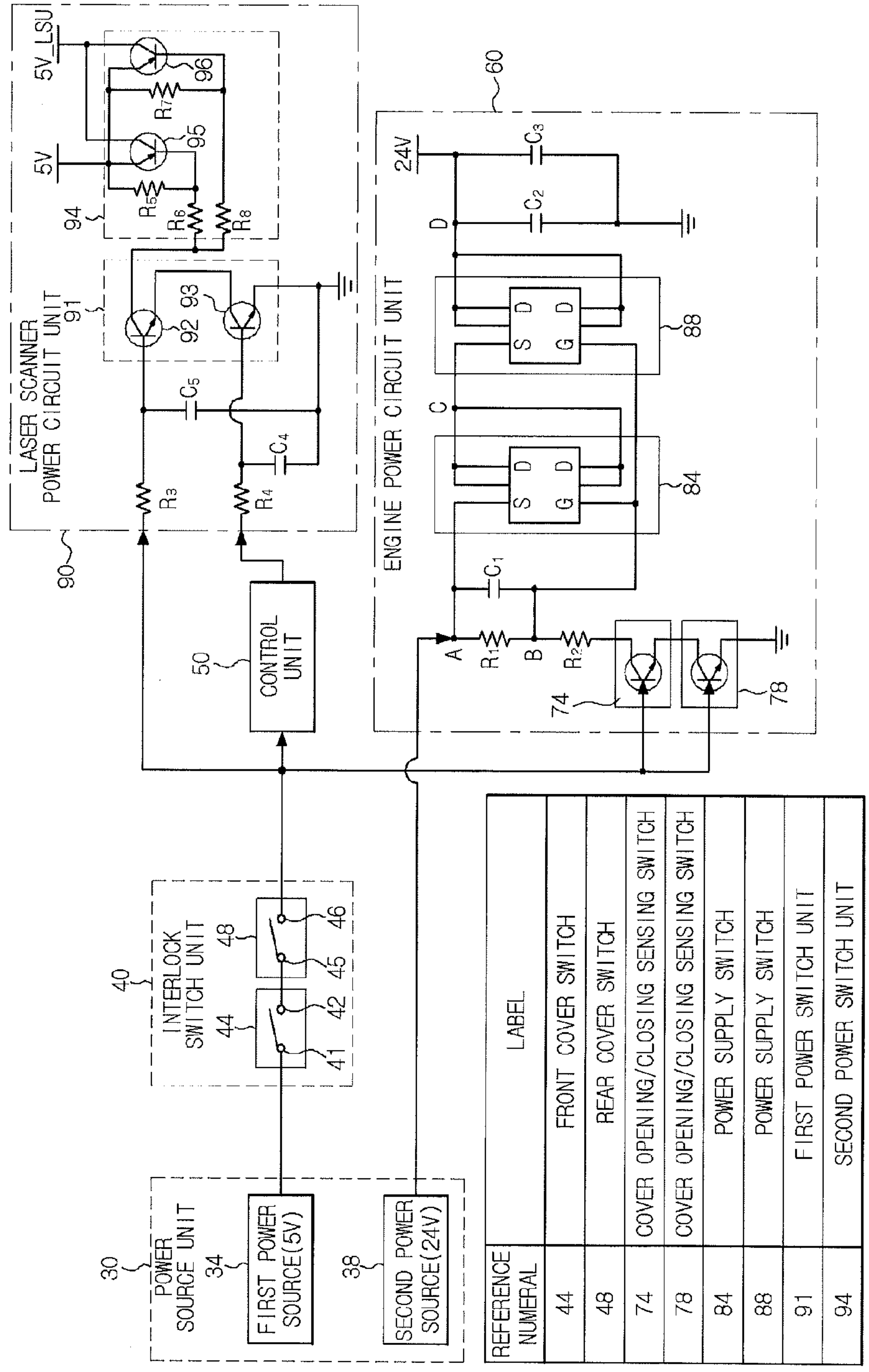
FIG. 3 is a block diagram illustrating a circuit configuration of an image forming apparatus according to an embodiment of the present general inventive concept.

FIG. 3 is a block diagram illustrating a circuit configuration of an image forming apparatus 1 according to another embodiment of the present general inventive concept.

The image forming apparatus 1 may include the power source unit 30, the interlock switch unit 40, the control unit 50, the engine power circuit unit 60, and a laser scanner power circuit unit 90.

Operations and circuit configuration of the power source unit 30, interlock switch unit 40 and engine power circuit unit 60 of FIG. 3 are identical to those of FIG. 2, and thus, a description thereof will be omitted. Hereinafter, only differences from FIG. 2, i.e. the laser scanner power circuit unit 90 and the control unit 50 will be described in detail.

The laser scanner power circuit unit 90 may include a first power switch unit 91 and a second power switch unit 94.

The first power switch unit 91 may include a switch 92, which is turned on or off according to a signal applied through the interlock switch unit 40, and a switch 93, which is turned on or off according to a signal applied from the control unit 50. The switches 92 and 93 may be transistors which are turned on or off according to signals applied to bases thereof.

The switch 92 may be turned on or off using a hardware method according to opening or closing of the cover 10 or 20. Also, the switch 93 may be turned on or off using a program (software) method according to opening or closing of the cover 10 or 20.

The hardware method represents a switching operation of the switch 92 performed by a signal directly received from the interlock switch unit 40, and the program method represents a switching operation of the switch 93 performed by a control signal of the control unit 50 according to the signal of the interlock switch unit 40.

The control unit 50 senses opening or closing of the cover 10 or 20 according to a signal applied through the interlock switch unit 40. The control unit 50 determines that the cover 10 or 20 is closed if the signal applied through the interlock switch unit 40 is a high-level signal, and outputs the high-level signal to the switch 93 of the first switch unit 91. In the closed state of the cover 10 or 20, the high-level signal is also output to the switch 92 of the first switch unit 91 through the interlock switch unit 40.

The plurality of switches 92 and 93 of the first switch unit 91 is turned on if the high-level signal is input from the interlock switch unit 40 and the control unit 50.

The switches 92 and 93 of the first switch unit 91 are connected to each other in series. If any one of the plurality of switches 92 and 93 is off, the first switch unit 91 enters an off state.

The second switch unit 94 may include a plurality of switches 95 and 96, each of which is turned on or off according to whether the first switch unit 91 is on or off. The plurality of switches 95 and 96 of the second switch unit 94 may be transistors. The second switch unit 94 may include voltage distribution resistors R5, R6, R7 and R8 to create a potential difference between a base and an emitter of the respective switches 95 and 96. If the first switch unit 91 is turned on, the voltage of the first power source 34 is distributed to the voltage distribution resistors R5, R6, R7 and R8. If the voltage of the first power source 34 is distributed, a predetermined potential difference occurs between the base and the emitter of the respective transistors, i.e. of the switches 95 and 96, causing the switches 95 and 96 to be turned on.

If the second switch unit 94 is turned on, the power (e.g., the voltage of 5V) output from the first power source 34 is bypassed through the second switch unit 94 to thereby be supplied to a laser scanner (not illustrated).

In the meantime, resistors R3 and R4 are provided at bases of transistors to prevent power loss after a predetermined signal is applied to the bases, and capacitors C4 and C5 function as auxiliary power sources.

Figure 4:
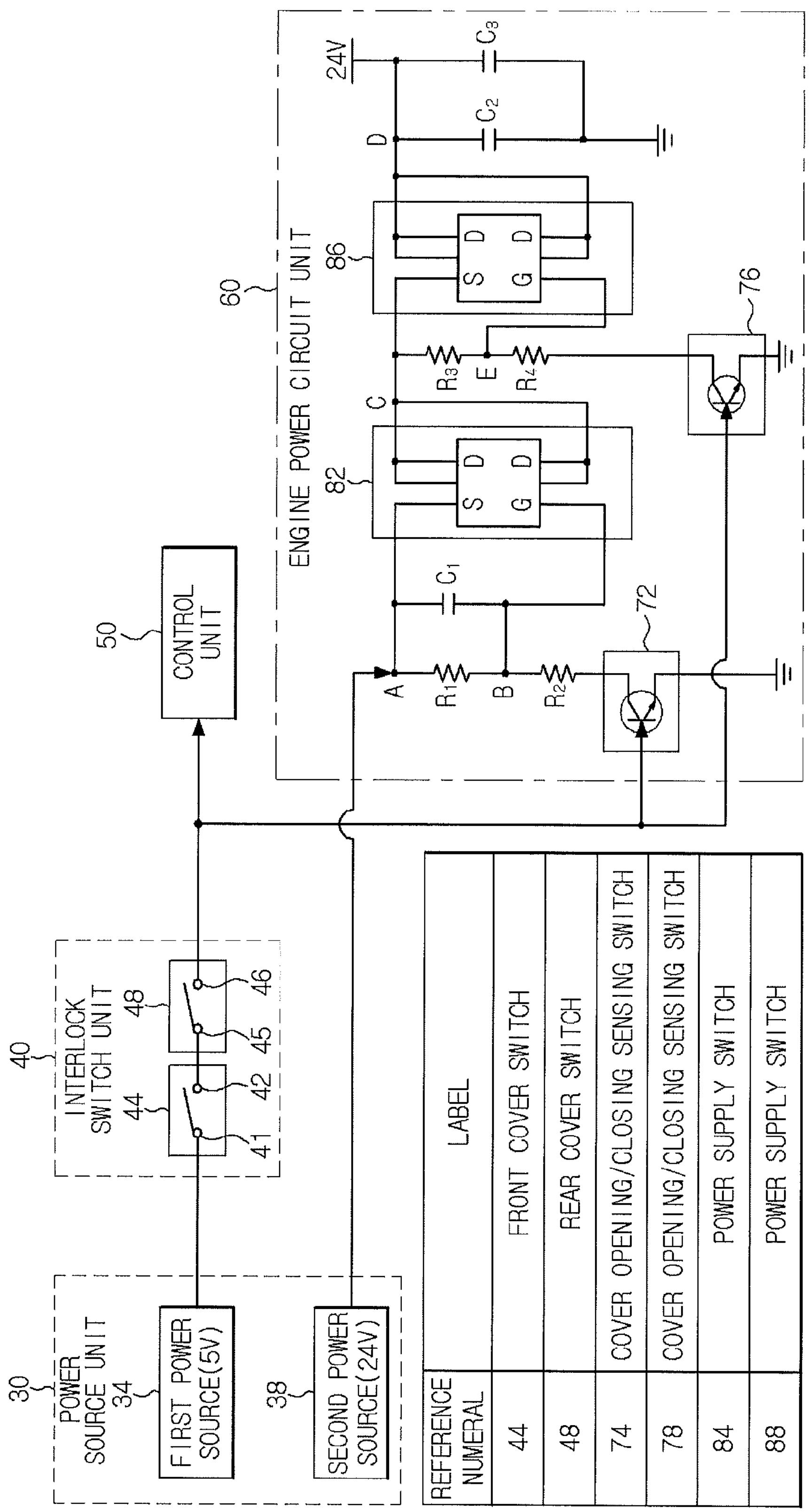
FIG. 4 is a block diagram illustrating a circuit configuration of an image forming apparatus according to an embodiment of the present general inventive concept.

FIG. 4 is a block diagram illustrating a circuit configuration of an image forming apparatus 1 according to another embodiment of the present general inventive concept.

The image forming apparatus 1 may include the power source unit 30, the interlock switch unit 40, the control unit 50, and the engine power circuit unit 60.

Operations and circuit configuration of the power source unit 30, interlock switch unit 40 and control unit 50 of FIG. 4 are identical to those of FIG. 2, and thus, a description thereof will be omitted. Hereinafter, only differences from FIG. 2, i.e., the engine power circuit unit 60 will be described in detail.

The engine power circuit unit 60 may include a plurality of cover opening/closing sensing switches 72 and 76 to receive a signal from interlock switch unit 40 depending on opening or closing of the covers 10 and 20, and a plurality of power supply switches 82 and 86 to receive engine drive power from the second power source 38.

The plurality of cover opening/closing sensing switches 72 and 76, which receives a signal depending on opening or closing of the covers 10 and 20, is connected respectively to the plurality of power supply switches 82 and 86 which receives power from the second power source 38. Referring to FIG. 4, the first and second transistors 72 and 76, which receive a signal depending on opening or closing of the covers 10 and 20 from the first power source 34, are connected respectively to the first and second power MOSFETs 82 and 86. The first transistor 72 switches the first power MOSFET 82 on or off, and the second transistor 76 switches the second power MOSFET 86 on or off. Even if either of the first and second transistors 72 or 76 breaks down, the other transistor 76 or 72 may switch the power MOSFETs 84 and 88 on or off. For example, if the first transistor 72 breaks down and is turned on, the first power MOSFET 84 is turned on regardless of opening or closing of the covers 10 and 20. However, the second transistor 76 may be turned off if the covers 10 and 20 are open, and the second power MOSFET 86 may be turned off in compliance with the second transistor 76, preventing the voltage of the second power source 38 from being applied to the point "D".

Hereinafter, a circuit operation of the image forming apparatus will be described with reference to FIG. 4.

If the front cover 10 and the rear cover 20 of the image forming apparatus 1 are closed, the front cover switch 44 and the rear cover switch 48 are turned on. If the front cover switch 44 and the rear cover switch 48 are turned on, the voltage (i.e., the high-level signal) of the first power source 34 is applied to the control unit 50 and the engine power circuit unit 60.

If the voltage (i.e., the high-level signal) of the first power source 34 is applied to the control unit 50, the control unit 50 may drive the engine using a program method, and may display the closing of the covers 10 and 20 via the display unit (not illustrated).

The engine power circuit unit 60 is configured such that the voltage of the first power source 34 is applied to the plurality of transistors 72 and 76 if the front cover switch 44 and the rear cover switch 48 are closed. The transistors 72 and 76, which are turned on or off according to the supply or interruption of the voltage of the first power source 34, are equal in number to the power MOSFETs 82 and 86 which receive the power of the second power source 38. The transistors 72 and 76, which are turned on or off according to the supply or interruption of the voltage of the first power source 34, are connected respectively to the power MOSFETS 82 and 86 which receive the voltage of the second power source 38, so as to be turned on or off under control. The number of the transistors 74 and 78 or 72 and 76, which are turned on or off according to the supply or interruption of the voltage of the first power source 34, and the number of the power MOSFETs 84 and 88 or 82 and 86, which receive the voltage of the second power source 38, may be respectively greater than two as illustrated in FIGS. 2 and 3, and are not limited.

If the voltage (i.e. the high-level signal) of the first power source 34 is input to the first transistor 72 of the engine power circuit unit 60, the first transistor 72 is turned on. If the first transistor 72 is turned on, the voltage of the second power source 38 applied to the point "A" is distributed to the point of "B" via the voltage distribution resistors R1 and R2. Thus, a potential difference occurs between the point "A" and the point "B", causing the same potential difference between a source S and a gate G of the first power MOSFET 82. If a predetermined potential difference occurs between the source S and the gate G of the first power MOSFET 82, the first power MOSFET 82 is turned on. If the first power MOSFET 82 is turned on, the voltage of the second power source 38 is applied to a drain D of the first power MOSFET 82 at a point C. Since the drain D of the first power MOSFET 82 is connected to a source S of the second power MOSFET 86, the voltage of the second power source 38 is applied to the source S of the second power MOSFET 86.

Then, if the voltage (i.e. the high-level signal) of the first power source 34 is input to the second transistor 76 of the engine power circuit unit 60, the second transistor 76 is turned on. If the second transistor 76 is turned on, the voltage applied to the source S of the second power MOSFET 86 is distributed to voltage distribution resistors R3 and R4, and a predetermined potential difference occurs between a point "C" and a point "E". Here, the predetermined potential difference has a magnitude sufficient to generate a potential difference between the gate G and the source S of the second power MOSFET 86 so as to turn on the second power MOSFET 86. Thereafter, the voltage of the second power source 38 is applied to the source S of the second power MOSFET 86, i.e., the point "C" as the second power MOSFET 86 performs the same operation as the above described first power MOSFET 82. In summary, the voltage of the second power source 38 is applied to the point "C" via switching of the first power MOSFET 82 and the second power MOSFET 86, and the voltage applied to the point "C" is used to drive the engine.

If at least one of the front cover 10 and the rear cover 20 of the image forming apparatus 1 is open, at least one of the front cover switch 44 and the rear cover switch 48 is turned off. If at least one of the front cover switch 44 and the rear cover switch 48 is turned off, the voltage (i.e., the high-level signal) of the first power source 34 is not applied to the control unit 50 and the engine power circuit unit 60. That is, instead of the high-level signal (for example, a signal corresponding to a voltage of 5V), a low-level signal (for example, a signal corresponding to zero volts) is applied to the control unit 50 and the engine power circuit unit 60.

If the low-level signal is applied to the control unit 50, the control unit 50 prevents driving of the engine using a program method and displays opening of the covers 10 and 20 via the display unit (not shown).

The engine power circuit unit 60 is configured such that the low-level signal is applied to the plurality of transistors 72 and 76 if at least one of the front cover switch 44 and the rear cover switch 48 is turned off.

If a signal generated when the voltage of the first power source 34 is not applied to the first transistor 72 of the engine power circuit unit 60, i.e. the low-level signal (for example, a signal corresponding to zero volts) is input to the first transistor 72, the transistor 72 is turned off. If the first transistor 72 is turned off, the voltage of the second power source 38 is not applied to the voltage distribution resistors R1 and R2 and therefore, the point "A" and the point "B" have the same voltage of the second power source 38. If the point "A" and the point "B" may not different voltages but may have the same voltage, the source S and the gate G of the first power MOSFET 82 have the same voltage, and therefore, the first power MOSFET is turned off. Thus, the voltage of the second power source 38 is not applied to the source S of the second power MOSFET 86. When at least one of the front cover 10 and the rear cover 20 of the image forming apparatus 1 is open, it may be possible to interrupt transmission of a voltage from the engine power circuit unit 60 to the engine using a hardware method.

Figure 5:
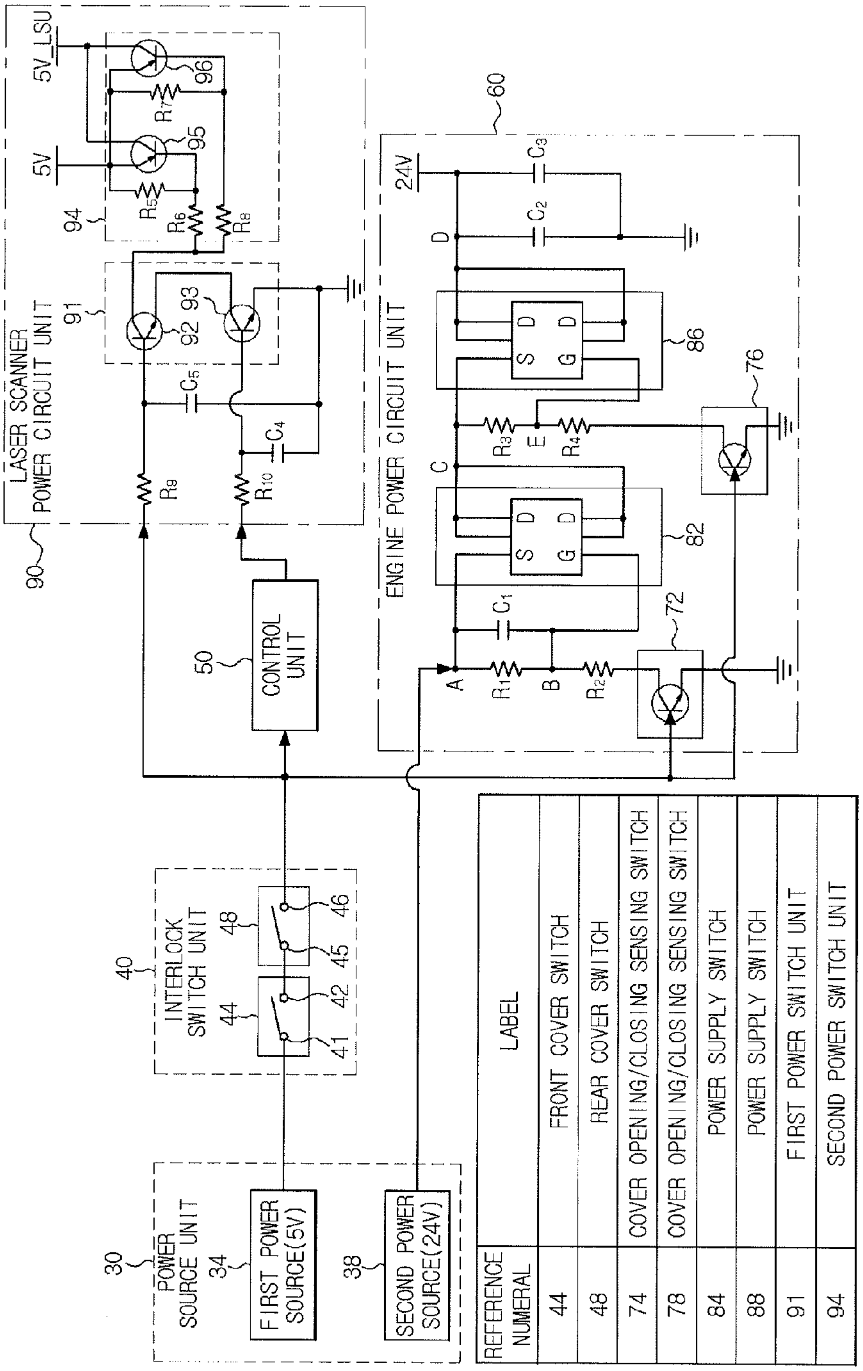
FIG. 5 is a block diagram illustrating a circuit configuration of an image forming apparatus according to an embodiment of the present general inventive concept

FIG. 5 is a block diagram illustrating a circuit configuration of an image forming apparatus 1 according to an embodiment of the present general inventive concept.

The image forming apparatus 1 may include the power source unit 30, the interlock switch unit 40, the control unit 50, the engine power circuit unit 60, and the laser scanner power circuit unit 90.

Operations and circuit configuration of the power source unit 30, interlock switch unit 40 and engine power circuit unit 60 of FIG. 5 are identical to those of FIG. 5. Also, the laser scanner power circuit unit 90 of FIG. 5 has the same configuration as that of FIG. 3 and thus, is represented by the same reference numbers and terms. For a detailed description of the present embodiment reference may be made to FIGS. 3 and 4.

Although the embodiments of FIGS. 2 to 5 describe the cover opening/closing sensing switches as being general transistors and the power supply switches as being power MOSFETs, these embodiments are not limited thereto, and of course, other devices having switching functions may be applied to the embodiments of the present general inventive concept.

Figure 6:
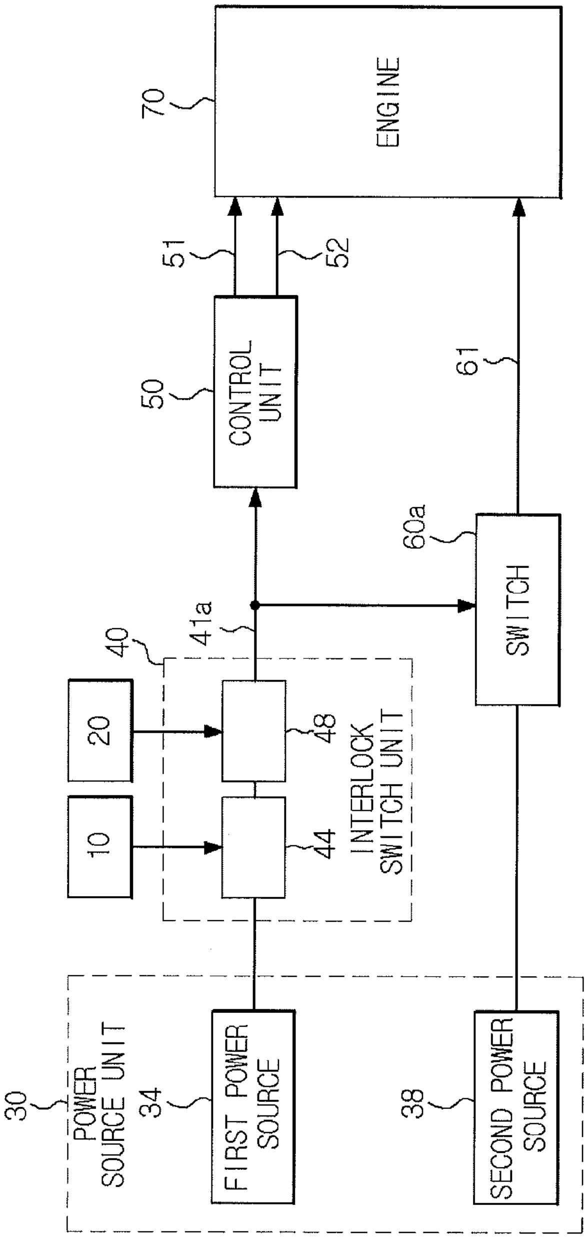
FIG. 6 is a block diagram illustrating an image forming apparatus according to an embodiment of the present general inventive concept.

Referring to FIG. 6, an image forming apparatus may have similar units to FIGS. 2 through 5. The image forming apparatus of FIG. 6 may include a unit 60*a* and an engine 70. The unit 60*a* may be similar to one of the engine power circuit units 60 of FIGS. 2 through 5. However, the present general inventive concept is not limited thereto. The unit 60*a* may have a different structure from the engine power circuit units 60 of FIGS. 2 through 5. That is, the unit 60*a* may have a transistor to selectively transmit a second power according to a status of a signal 41*a* of the interlock switch unit 40 which corresponds to a first power of the first power source 34. The unit 60*a* may receive the signal 41*a* corresponding to the first power from the first power source 34 through the interlock switch unit 40 and the second power from the second power source 38 and transmits the second power according to a state of the signal 41*a* of the interlock switch unit 40.

The control unit 50 may receive the signal 41*a* from the interlock switch unit 40 and may also receive a data signal corresponding to a printing operation or a scanning operation of the image forming operation. The control unit 50 may generate a first control signal 51 according to the signal 41*a* of the interlock switch unit 40 to supply the first power to the engine 70 and may also generate a second control signal 52 to control the engine 70 to perform an operation of the image forming apparatus. The engine 70 may have a structure to perform the operation of the image forming apparatus. Since the structure of the engine 70 is well known, detail descriptions thereof will be omitted. The engine 70 receives the first control signal 51, the second control signal 52 and a power supply 61 corresponding to the second power, so that an image forming unit of the engine 70 can operate to form an image the according to the first control signal 51, the second control signal 52 and a power supply 61. According to the status of the covers 10 and/or 20, the signals 51 and/or 52 and the power supply 61 may not be supplied but interrupted.

Figure 7:
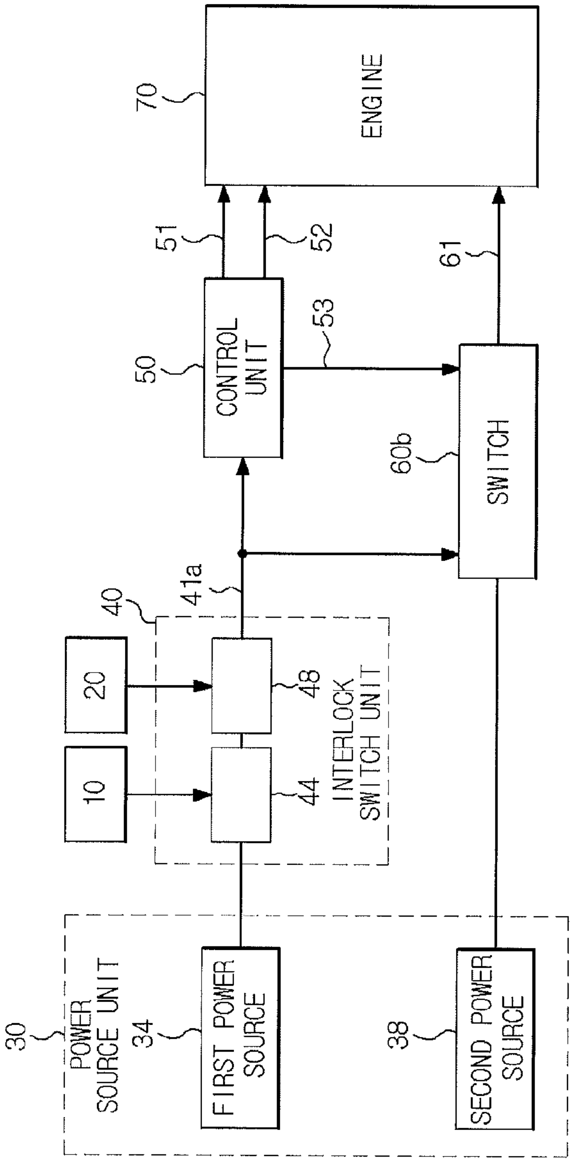
FIG. 7 is a block diagram illustrating an image forming apparatus according to an embodiment of the present general inventive concept.

Referring to FIG. 7, the control unit 50 may generate a third control signal to control the unit 60*b*, and the unit 60*b* may have a circuit corresponding to an AND gate circuit to generate the power supply 61 corresponding to the second power according to the signal 41*a* of the interlock switch unit 40 and the third control signal of the control unit 50.

Figure 8:
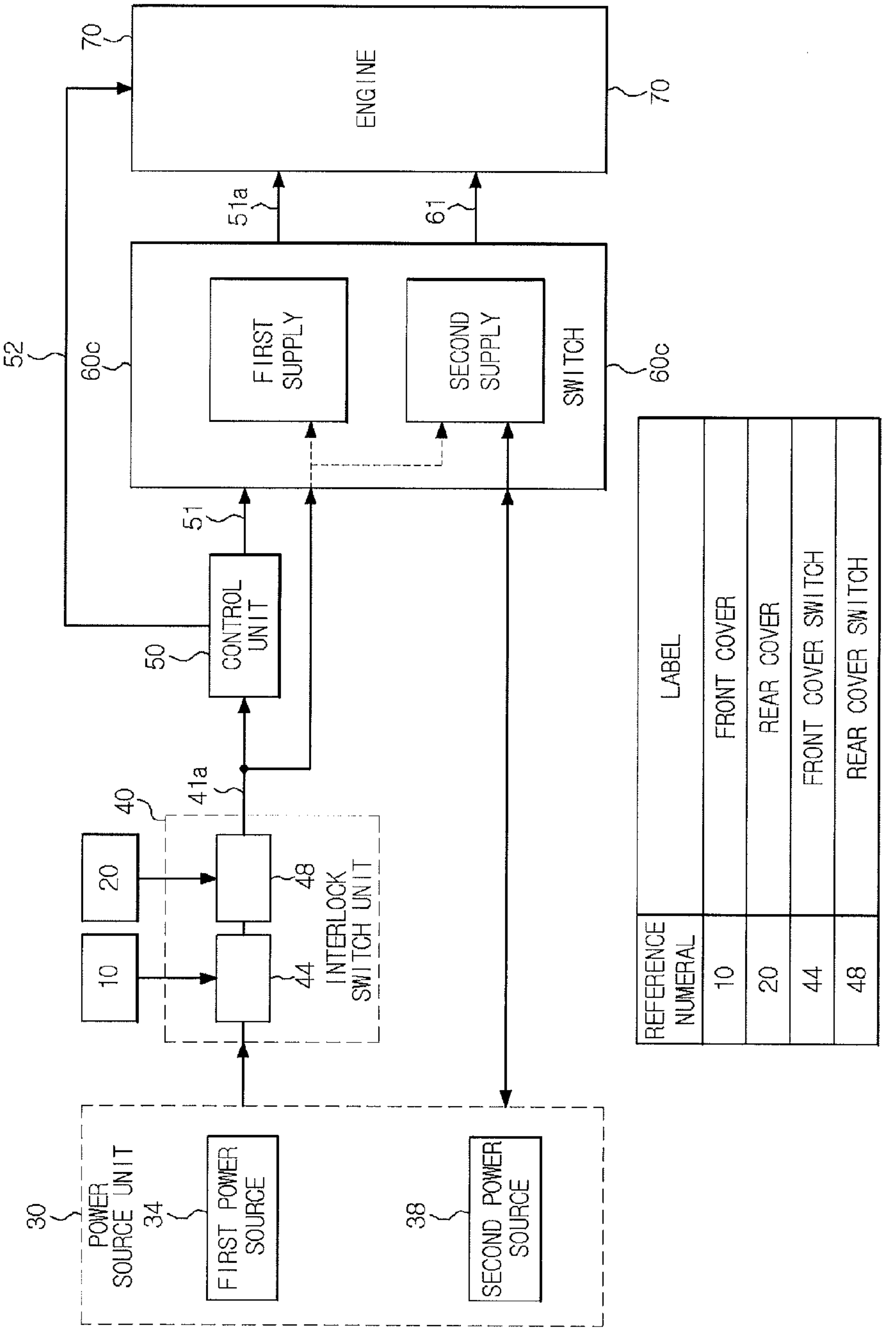
FIG. 8 is a block diagram illustrating an image forming apparatus according to an embodiment of the present general inventive concept.

Referring to FIG. 8, a unit 60*c* may have a first supply switch and a second supply switch. The first supply switch of the unit 60*c* may output another control signal 51*a* to the engine 70 according to the first control signal 51 of the control unit 50 and a signal 41*a* of the interlock switch unit 40. The second supply switch of the unit 60*c* may output the power supply 61 according to the second power of the second power source 38 and the signal 41*a* of the interlock switch unit 40.

Although not illustrated above, it is possible that the second supply switch of the unit 60*a* may receive the second power of the second power source 38, the signal 41*a* of the interlock switch unit 40, and the first control signal 501 of the control unit 50, and then output the power supply 61 according to the according to at least one state of the second power of the second power source 38, the signal 41*a* of the interlock switch unit 40, and/or the first control signal 51 of the control unit 50.

As is apparent from the above description, according to the embodiment of the present general inventive concept, a plurality of switches is used to control application or interruption of operating power based on opening or closing of a cover, realizing a more stable voltage supply circuit of an image forming apparatus.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. An image forming apparatus to apply or interrupt operating power according to opening or closing of covers of the image forming apparatus, comprising:
   - a power source unit including a first power source to output low power and a second power source to output high power;
   - an interlock switch unit connected to the first power source to be turned on or off according to closing or opening of the covers; and
   - an engine power circuit unit, the engine power circuit unit including:
     - a plurality of cover opening/closing sensing switches connected to the interlock switch unit while being connected to each other in series so as to be turned on or off according to a determination of whether the interlock switch unit is on or off; and
     - a plurality of power supply switches connected to each other in series and connected to the second power source and the cover opening/closing sensing switches to apply or interrupt the high power output from the second power source to an engine according to whether the cover opening/closing sensing switches are on or off, wherein the plurality of cover opening/closing sensing switches is provided in series between a ground and the second power source such that the plurality of cover opening/closing sensing switches are connected to the plurality of power supply switches via voltage distribution resistors configured to create a predetermined potential difference for turning on the plurality of power supply switches.

2. The apparatus according to claim 1, wherein the power supply switches are turned on if all of the plurality of cover opening/closing sensing switches connected in series is turned on.

3. The apparatus according to claim 1, wherein the power supply switches are turned off if at least one of the plurality of cover opening/closing sensing switches connected in series is turned off.

4. The apparatus according to claim 1, wherein the plurality of power supply switches is connected to each other in series, and the high power is not applied to the engine if at least one of the plurality of power supply switches is turned off.

5. The apparatus according to claim 1, wherein any one of the plurality of power supply switches is connected to the second power source to receive the high power.

6. The apparatus according to claim 5, wherein, if one of the power supply switches connected to the second power source to receive the high power is turned on, the high power is transmitted to another power supply switch.

7. The apparatus according to claim 5, wherein:

if the cover opening/closing sensing switches are turned on, a voltage of the second power source is distributed to the voltage distribution resistors and the power supply switches are turned on according to the distributed voltage.

8. The apparatus according to claim 1, wherein the interlock switch unit includes a same number of the interlock switches as the covers, and the interlock switches are connected to each other in series.

9. The apparatus according to claim 1, further comprising a control unit to control driving of the engine according to the supply or interruption of the low power.

10. An image forming apparatus to apply or interrupt operating power according to opening or closing of a cover, comprising:

a power source unit including a first power source to output low power and a second power source to output high power;

an interlock switch unit connected to the first power source so as to be turned on or off according to closing or opening of the cover; and an engine power circuit unit, the engine power circuit unit including:

a plurality of power supply switches connected to each other in series and connected to the second power source to apply or interrupt the high power to an engine; and a plurality of cover opening/closing sensing switches connected to the interlock switch unit to be turned on or off according to a determination of whether the interlock switch unit is on or off, the plurality of cover opening/closing sensing switches corresponding to the plurality of power supply switches respectively, wherein the plurality of cover opening/closing sensing switches is provided in series between a ground and the second power source such that the plurality of cover opening/closing sensing switches are connected to the plurality of power supply switches via voltage distribution resistors configured to create a predetermined potential difference for turning on the plurality of power supply switches.

11. The apparatus according to claim 10, wherein any one of the plurality of power supply switches is connected to the second power source to receive the high power.

12. The apparatus according to claim 11, wherein, if one of the power supply switches connected to the second power source to receive the high power is turned on, the high power is transmitted to another power supply switch.

13. The apparatus according to claim 11, wherein:

if the cover opening/closing sensing switches are turned on, a voltage of the second power source is distributed to the voltage distribution resistors and the power supply switches are turned on according to the distributed voltage.

14. The apparatus according to claim 10, further comprising a control unit to control driving of the engine according to the supply or interruption of the low power.

15. An image forming apparatus to apply or interrupt operating power according to opening or closing of covers of the image forming apparatus, comprising:

a power source unit including a first power source to output low power and a second power source to output high power;

an interlock switch unit connected to the first power source to generate a signal to indicate opening or closing of the covers;

a control unit to generate a control signal according to the signal of the interlock switch unit; and a unit to receive the signal of the interlock switch unit through a plurality of cover opening/closing sensing switches connected to each other in series between a ground and the second power source, and connected to the interlock switch unit, and to transmit the high power to an engine according to the signal of the interlock switch unit through a plurality of power supply switches connected to each other in series and connected to the second power source, wherein the lower power is selectively supplied to the engine according to the signal of the interlock switch unit and the control single of the control unit such that the plurality of cover opening/closing sensing switches are connected to the plurality of power supply switches via voltage distribution resistors configured to create a predetermined potential difference for turning on the plurality of power supply switches.

16. The image forming apparatus of claim 15, further comprising:

a switch disposed between the control unit and the engine to supply the low power to the engine according to the signal of the interlock switch unit and the control signal of the control unit.

17. The image forming apparatus of claim 16, wherein the switch comprises an AND gate circuit having two inputs of the signal of the interlock switch unit and the control signal of the control unit and an output of the supplied low power to the engine.

18. The image forming apparatus of claim 15, wherein the unit comprises:

a first switch to transmit the lower power to an engine according to the signal of the interlock switch unit and the control signal of the control unit; and a second switch to transmit the high power to the engine according to the signal of the interlock switch unit.

19. The image forming apparatus of claim 15, wherein the unit comprises one or more AND gate circuit.

20. A method of an image forming apparatus having one or more covers, the method comprising:

outputting a lower power from a first power source and a high power from a second power source;

generating a signal according to at least one opening or closing status of the covers using an interlock switch unit;

generating a control signal according to the signal of the interlock switch unit;

receiving the signal of the interlock switch unit through a plurality of cover opening/closing sensing switches connected to each other in series between a ground and the second power source, and connected to the interlock switch unit; and transmitting the high power through a plurality of power supply switches connected to each other in series and connected to an engine according to the signal of the interlock switch unit, wherein the lower power is selectively supplied to the engine according to the signal of the interlock switch unit and the control single of the control unit such that the plurality of cover opening/closing sensing switches are connected to the plurality of power supply switches via voltage distribution resistors configured to create a predetermined potential difference for turning on the plurality of power supply switches.

* * * * *